United States Patent
Rune et al.

(10) Patent No.: US 8,630,648 B2
(45) Date of Patent: Jan. 14, 2014

(54) VERIFYING NEIGHBOR CELL

(75) Inventors: Johan Rune, Lidingö (SE); Jose Alonso-Rubio, Stockholm (SE); Göran Selander, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 210 days.

(21) Appl. No.: 13/061,758

(22) PCT Filed: Sep. 2, 2008

(86) PCT No.: PCT/IB2008/002275
§ 371 (c)(1),
(2), (4) Date: May 10, 2011

(87) PCT Pub. No.: WO2010/026438
PCT Pub. Date: Mar. 11, 2010

(65) Prior Publication Data
US 2011/0263282 A1 Oct. 27, 2011

Related U.S. Application Data

(60) Provisional application No. 61/190,730, filed on Sep. 2, 2008.

(51) Int. Cl.
*H04W 36/00* (2009.01)
(52) U.S. Cl.
USPC ............................ 455/438; 455/436; 455/439
(58) Field of Classification Search
USPC .......................................... 455/436, 438, 439
See application file for complete search history.

(56) References Cited

U.S. PATENT DOCUMENTS 8,179,860 B2 * 5/2012 Brusilovsky et al. ......... 370/331
2001/0039613 A1 * 11/2001 Ohishi .......................... 713/156
(Continued)

FOREIGN PATENT DOCUMENTS

WO 2008157545 A 12/2008

OTHER PUBLICATIONS

Universal Mobile Telecommunications System (UMTS); Evolved Universal Terrestrial Rasio Access (E-UTRA) and Evolved Universal Terrestrial Radio Access (-E-UTRAN); Overal description Stage 2 (3GPP TS 36.300 version 8.5.0 Release 8).*

(Continued)

*Primary Examiner* — Lester Kincaid
*Assistant Examiner* — Mehmood B Khan
(74) *Attorney, Agent, or Firm* — Potomac Patent Group PLLC

(57) ABSTRACT

A base station, computer readable medium and method for determining whether a neighbor cell is a neighbor of a serving cell, where the serving cell and the neighbor cell belong to a same communication network that includes a user terminal served by the serving cell. The method includes receiving at a base station of the serving cell, via the user terminal, a first identity of the neighbor cell, a second identity of the neighbor cell, and a random number generated by a base station of the neighbor cell; sending, from the base station of the serving cell, a request to the base station of the neighbor cell, for establishing a neighbor relation, wherein the request includes the received random number; and obtaining at the base station of the serving cell a response from the base station of the neighbor cell in response to the request, the response indicating acceptance or denial of the neighbor relation.

20 Claims, 12 Drawing Sheets

(56) References Cited

U.S. PATENT DOCUMENTS

| | | | | |
|---|---|---|---|---|
| 2005/0157871 | A1* | 7/2005 | Komano et al. | 380/28 |
| 2006/0080727 | A1* | 4/2006 | Hammons et al. | 726/3 |
| 2007/0060127 | A1* | 3/2007 | Forsberg | 455/436 |
| 2007/0071234 | A1* | 3/2007 | Lagrange et al. | 380/28 |
| 2007/0206535 | A1* | 9/2007 | Sood et al. | 370/331 |
| 2008/0108353 | A1* | 5/2008 | Lee et al. | 455/437 |
| 2008/0207195 | A1* | 8/2008 | Ranta et al. | 455/423 |
| 2008/0207207 | A1 | 8/2008 | Moe et al. | |
| 2008/0227455 | A1* | 9/2008 | Kim | 455/436 |
| 2008/0301793 | A1* | 12/2008 | Kim et al. | 726/10 |
| 2009/0005052 | A1* | 1/2009 | Abusch-Magder et al. | 455/446 |
| 2009/0220087 | A1* | 9/2009 | Brusilovsky et al. | 380/272 |
| 2009/0233607 | A1* | 9/2009 | Claussen et al. | 455/437 |
| 2009/0265543 | A1* | 10/2009 | Khetawat et al. | 713/151 |
| 2010/0278161 | A1* | 11/2010 | Ore et al. | 370/338 |

OTHER PUBLICATIONS

International Search Report for PCT/IB2008/002275 mailed Jun. 2, 2009.

Written Opinion for PCT/IB2008/002275 mailed Jun. 2, 2009.

International Preliminary Report on Patentability for PCT/IB2008/002275 mailed Dec. 9, 2010.

3GPP, "3rd Generation Partnership Project; Technical Specification Group Services and System Aspects; Universal Geographical Area Description (GAD) (Release 7)," Technical Specification, 3GPP TS 23.032, V7.0.0, Jun. 2006, pp. 1-29.

3GPP, "3rd Generation Partnership Project; Technical Specification Group Radio Access Network; Stage 2 Functional Specification of User Equipment (UE) positioning in UTRAN (Release 8)," Technical Specification, 3GPP TS 25,305, V8.0.0, Dec. 2007, pp. 1-19.

3GPP, "3rd Generation Partnership Project; Technical Specification Group Services and System Aspects; 3G Security; Network Domain Security; IP network layer security (Release 7)," Technical Specification, 3GPP TS 33.210, V7.3.0, Sep. 2007, pp. 1-21.

3GPP, "Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.5.0 Release 8)," Technical Specification, ETSI TS 136 300, V8.5.0, Jul. 2008, pp. 1-138, XP014042193.

Nortel, "ANR Neighbors IP address lookup and establishment," 3GPP TSG-RAN WG3 Meeting #60, R3-081226, Kansas City, Missouri, US, May 5-9, 2008, pp. 1-5, XP050164407.

\* cited by examiner

VERIFYING NEIGHBOR CELL

RELATED APPLICATION

This application is a 371 National Stage Application of International Application No. PCT/IB2008/002275, filed on Sep. 2, 2008, which claims priority to Patent Application Ser. No. 61/190,730, filed on Sep. 2, 2008, entitled "Inter-Base Stations Communication Using Terminal Device" to H. Levkowetz, the entire disclosures of which are incorporated here by reference.

TECHNICAL FIELD

The present invention generally relates to radio communication systems, devices, software and methods and, more particularly, to mechanisms and techniques for verifying that an asserted neighbor cell is indeed a neighbor cell.

BACKGROUND

During the past years, the interest in radio access technologies for providing services for voice, video and data has increased. There are various telecom technologies used in cellular communications. The most widespread radio access technology for mobile communication is digital cellular. Increased interest is shown in 3G (third generation) systems. 3G systems and, then, even higher bandwidth radio communications introduced by Universal Terrestrial Radio Access (UTRA) standards made applications like surfing the web more easily accessible to millions of users.

Even as new network designs are rolled out by network manufacturers, future systems which provide greater data throughputs to end user devices are under discussion and development. For example, the so-called 3GPP Long Term Evolution (LTE) standardization project is intended to provide a technical basis for radio communications in the decades to come. The air interface of LTE is also called E-UTRAN, Evolved UTRA Network. An overall description of E-UTRA is found in the description Stage 2 (3GPP TS 36.300 version 8.5.0 Release 8) ETSI TS 136 300 of 1 Jul. 2008. Among other things of note with regard to LTE systems is that they provide for creation of neighbor cell relations in eNodeBs (eNBs), where an eNodeB (eNB) is the base station of the LTE system. More specifically, with respect to FIG. 1, a telecommunication system 10 may include one or more eNBs 12 that are connected via an interface S1 to a core network 14 of the system. Another interface X2 connects the eNBs 12 among themselves. One eNB may serve one or more cells 16. The generic term "base station" is used to refer to an eNB in the LTE system or a NodeB in a WCDMA system or for other base stations of other systems as will be appreciated by those skilled in the art. Also for simplicity, it is assumed that each eNB serves only one cell although an eNB may serve multiple cells.

In the following, the base station of interest is referred to as the "serving base station" and a neighbor base station is referred to as the "neighbor base station." Each cell in a telecommunication system is assigned one of 504 possible physical cell identities (PCI). The PCI may be broadcasted on layer 1 in the cell. Knowledge of the PCI of the cell is needed for a terminal (also called user equipment, user terminal, which is implemented as a mobile phone, personal digital assistant, camera, etc.) to correctly decode a downlink transmission in a cell. Thus, the PCI is used to distinguish cells from each other and to enable decoding of downlink transmissions. Because the 504 different PCIs are not enough to give every cell a unique PCI (i.e., there are more than 504 cells in a given telecommunication network), the PCIs are reused in a radio network. FIG. 2 illustrates an example of how the PCIs of cells in a telecommunication network are reused. Sufficient reuse distances should be used between cells A and C that have the same PCI, so that PCI conflicts are minimized. However, when PCI conflicts occur, these conflicts should be resolved, i.e., at least one cell should have its PCI changed so that the conflict is eliminated. The PCI is a physical layer parameter, which may be easily and quickly read by a terminal. This parameter is reported to the base stations together with Reference Signal Received Power (RSRP) levels in measurement reports generated by the terminals. A base station (or another type of node in the network in some cellular telecommunication systems) may use these measurement reports, e.g., to determine whether the reporting terminal should be handed over to another cell.

The PCI is relevant to another aspect of a telecommunication system, which is discussed next. During a call (i.e., while maintaining a connection with or via the cellular network), a mobile terminal 18 moves around from a serving cell 16a to a neighbor cell 16b, moving from one cell to one of its neighbors repeatedly. A list of the known neighbor cells of the serving cell 16a (the same is true for each serving cell), called "neighbor cell set," may be used both by the network 10 and by the mobile terminal 18 to enable reliable handover between cells. The network 10 may store information relating to a neighbor cell set. The neighbor cell set may be used for evaluation and handover of any mobile terminal, from one cell to another cell, as the mobile terminal crosses a cell boundary. The neighbor cell set is generated based on the PCIs of the cells in the network. A factor that affects the neighbor cell set is the fact that the cell boundaries are not sharply defined. The cell boundaries are somewhat blurred as the range of the base stations overlap with one another and thus, these facts need to be taken into account when generating the neighbor cell list.

A different approach for avoiding PCI conflict is the use of Global or Network Level Cell Identity. Different terms are used for the global or network level cell identity. The term used in this disclosure is Public Land Mobile Network (PLMN) level cell identity (CIPL). A CIPL is unique within the PLMN. Thus, there is no conflict between any two cells in the PLMN. The combination of a CIPL and a PLMN identity (e.g., Mobile Country Code (MCC) combined with Mobile Network Code (MNC)) becomes a globally unique identification of a cell, often referred to as a Global Cell Identity (GCI) or Cell Global Identity (CGI). Both the CIPL and the PLMN identity may be included in the system information that is periodically broadcast in each cell. Because a CIPL, unlike a PCI, is unique within a PLMN, no reuse coordination of CIPLs is needed.

However, using CIPL and PLMN identity (PLMN ID) is much more demanding for a terminal than reading the PCI. The usage of the CIPL and PLMN ID requires that the terminal is properly synchronized with the cell and that the terminal waits for a periodic transmission of the relevant part of the system information to occur.

The creation of the neighbor cell relations for each cell may be based on the PCI or the combination of CIPL and PLMN ID discussed above. In most cellular systems, the creation of the neighbor cell relations is a management task that takes into account the configuration of the system. However, in LTE, this method is abandoned in favor of automatic detection of neighbor cells aided by terminal and subsequent automatic creation of the neighbor relation, establishment of the X2 interface, and exchange of relevant information between the involved eNBs (unless the neighboring cells belong to the same eNB, in which case the neighbor relation creation, albeit possibly not neighbor detection, is an entirely eNB internal matter).

This approach relies on measurement reports from active terminals to detect neighbor cells. The reports may include the PCIs (as well as other measurement parameters) of detected cells. When a PCI of a base station that is new to the serving eNB is reported, the serving eNB requests the terminal to read and report the CIPL and PLMN ID of the new cell with the relevant PCI. This action requires that the serving eNB schedules a measurement gap, i.e., a gap in the regular transmissions to and from the terminal, during which the terminal may tune and synchronize its receiver to the other cell until the CIPL and PLMN ID have been received. The term "new" is used here, for example, for a cell that was not previously reported by any user terminal to the base station of the serving cell. Alternatively or in addition, the term "new" includes the case when the base station of the serving cell does not know the global cell identity corresponding to the PCI reported by the user terminal, which is due to the fact that the PCI has not been reported before and thus, the base station has not had any reason to find it out. For example, the identity may be old but just recently turned into a potential neighbor cell due to a change in the radio environment (e.g., a torn down building).

When the terminal has reported the CIPL and PLMN ID of the new possible neighbor cell, the serving eNB may conclude that the new cell belongs to the same PLMN as the serving eNB itself, and may choose to include the new cell into its list of neighbor cells. The serving eNB then may use the CIPL to retrieve the IP address of the neighbor eNB, which serves the detected new cell, establish the X2 interface with this neighbor eNB (unless the X2 interface was already established), and exchange information which is relevant for the X2 interface and the neighbor relation. This process of building neighbor cell lists is referred to as Automatic Neighbor Relation (ANR).

FIG. 4 illustrates a possible exchange of information between serving eNB 12a, new eNB 12b and a terminal 18 served by the serving eNB 12a. In step 1, terminal 18 detects the PCI of the new eNB 12b. In step 2, terminal 18 reports the PCI and other measurements of the new eNB 12b to the serving eNB 12a. In step 3, the serving eNB 12a schedules the measurement gap during which terminal 18 synchronizes with the new eNB 12b to detect other parameters of the new eNB 12b. Then, in step 4, the serving eNB 12a instructs terminal 18 to detect PLMN ID and CIPL of the new eNB 12b. In step 5, terminal 18 receives the PLMN ID and CIPL from the new eNB 12b and in step 6 terminal 18 transmits this information to the serving eNB 12a. Based on this information, the serving eNB 12a and the new eNB 12b establish interface X2 and each generate/update its neighbor relation. The interface X2 may be part of a transport network 20, which may be implemented as a landline. An alternative to scheduling measurement gaps (step 3), i.e., transmission gaps dedicated for retrieval of the PLMN ID and CIPL of a detected neighbor cell, is to place the user terminal in a DRX (Discontinuous Reception) mode, in which the periods when the terminal is not obliged to listen for transmissions from the serving eNB are long enough to allow retrieval of PLMN ID and CIPL of a neighbor cell. Yet a potential variation of the above procedure is that the terminal 18 reports the PCI, PLMN ID and CIPL of a detected neighbor cell without a prior report of only the PCI.

A concern exists when new cells are entering the system and neighbor cell relations are generated. This concern is related to the security of the system and is addressed next. The communication between two eNBs is supposed to be performed via the operator's protected zone (part of the Network Domain Security (NDS), see for example 3GPP TS 33.210 v7.3.0, "3rd Generation Partnership Project; Technical Specification Group Services and System Aspects; 3G Security; Network Domain Security; IP network layer security (Release 7)", September 2007, the entire content of which is incorporated here by reference). It is also supposed that each eNB 12a and 12b (or each eNB site) has established a secure communication path 22 to the operator network 24, as shown in FIG. 5. Thus, the two eNBs 12a and 12b communicate via a virtual private network (VPN), which means that the two eNBs trust each other and their mutual communication is secure. The communication path 26 over the X2 interface is also secure while communications over network 28 are insecure.

Alternatively, the two eNBs may communicate directly, without being routed via the operator's NDS zone, as shown in FIG. 6. In this case, each pair of eNBs (or pair of eNB sites) having neighbor relations has to secure the mutual communication of the base stations of the pair. Securing the communication may be achieved using IP security (IPsec, according to RFC 4301) based on Security Association (SAs) established using Internet Key Exchange version 2 (IKEv2) authenticated by certificates. In this alternative, the certificates and IPsec provide a similar security as in the NDS case, i.e., the pair of eNBs can trust each other and their mutual communication 22 is secure as illustrated in FIG. 6. In addition, FIG. 6 shows that the secure communication 22 is not routed via the operator's NDS zone 24.

Using direct communication via eNB-eNB X2 interface achieves a shorter communication path and eliminates the cryptographic operations in the operator network's security gateways. Thus, according to one scenario, an X2 communication via the operator network is the initial track and subsequently, a direct eNB-eNB X2 communication path may be established as the final communication path.

However, a couple of problems to be discussed next affect the above noted setup for eNB to eNB communications. A first problem affecting the above described procedure for generating and implementing neighbor relations is that although the actual neighbor relation establishment is secure, in terms of trust relations and protected communication, the relevancy of a reported neighbor is not known. In other words, there is no mechanism for determining whether an alleged neighbor cell is indeed a neighbor cell and thus whether an alleged neighbor eNB is indeed a neighbor eNB. An example is described next to illustrate this problem. Suppose that a malicious terminal reports false CIPLs collected from other parts of the network, which are not neighbor cells of the serving cell. The serving eNB, not being configured to determine the relevancy of the asserted neighbor cells, would establish unwanted neighbor relations with cells that are in fact not neighbor cells.

Another example that illustrates this problem is as follows. Suppose that two malicious terminals, $UE_A$ and $UE_B$ communicate with each other from different (geographically distant) parts of the network. $UE_A$ collects CIPLs from location A and sends the CIPLs to $UE_B$ at location B. Then, $UE_B$ may report these geographically distant CIPLs, collected in real-time, to the serving eNB. The geographically distant CIPLs correspond to cells that are not neighbor cells of the serving cell. Thus, these CIPLs correspond to alleged neighbor candidates. Not having a mechanism to check that the alleged neighbor candidates are neighbors indeed, the serving eNB would establish communication with these alleged neighbor cells and add them to the neighbor cell relations. This results in unnecessary neighbor relations being established. In this context, $UE_A$ does not have to be an actual terminal. It may be some other type of device, as long as it can receive and decode the system information broadcast from LTE eNBs.

Establishing unnecessary neighbor relations may drain an eNB's resources and also may limit the capability of the eNB to establish valid neighbor relations, especially when the eNB cannot maintain an unlimited number of neighbor relations. Although the LTE standard may place no hard restrictions on the number of neighbor relations a cell or eNB may have, the fact that each neighbor cell has a PCI that is unique among the neighbors sets an upper bound. In addition, most implementations likely have their own limit on the number of neighbor relations, after which the eNB accepts no new ones until some of the existing ones have been terminated. In practice, an eNB may monitor the usage frequency (and handover success rate) of each cell listed in the neighbor cell relations, so that unnecessary neighbor relations are eventually terminated.

Still another example when an eNB is affected by false neighbor cells is discussed next. Suppose that a new cell or eNB is entering service in the network. Initially, the new eNB has no neighbor relations. The neighbor relations are built up gradually, aided by moving terminals. At this point, a malicious terminal has the opportunity to "fill up" the eNB with false neighbor relations, so that there is no more "room" left for real neighbor relations to true neighbors. It will then take some time (which is implementation dependent) until the eNB determines that most of its neighbor relations are unnecessary and starts removing these unnecessary relations. Until this happens, handovers to and from the new eNB are not possible. Thus, this is a potential threat that should be avoided if possible.

Another consequence of adding excessive numbers of false neighbors to a given cell or eNB is that it increases the risk of PCI conflicts. In addition, it will be increasingly hard to find a collision free PCI for a cell whose PCI has to be changed because of a detected PCI collision or for a newly deployed cell. This may trigger (sometimes extensive) reshuffling of PCIs among cells in the network in order to avoid (the actually non-existent) PCI conflicts, resulting in traffic disturbances and dropped connections.

Another problem with establishing neighbor relations relates to the Internet Key Exchange (IKE) processing performed by an eNB or a site Security Gateway (SEGW) in establishing security association for direct X2 communications. It may well be the case that X2 communication via the operator network as shown in FIG. 5 introduces large latency, e.g., for handover situations because of multiple encryptions and decryptions and other cryptographic operations performed by the repeated IPsec processing on the path, so that direct X2 communication as shown in FIG. 6 is preferable.

Hence, when a serving eNB is presented with a new neighbor, or a new neighboring site, this may trigger heavy public key cryptography operations of IKE, reducing the available capacity in the eNB or SEGW for other operations. Generating multiple X2 connections to alleged neighbor eNBs may trigger a Denial-of-Service attack on both serving and alleged neighbor base stations. In particular, by presenting a particular alleged neighbor eNB to multiple serving eNBs in a distributed and synchronized attack, the alleged neighbor base station may be "detained" when establishing unnecessary secure connections between eNBs or sites. This attack may be effective not only during the network deployment phase but under other scenarios.

Although malicious terminals are not very often present and considerable knowledge is required to create one, the threat of manipulated terminals interfering with network activities is serious and problematic for existing networks. When the network, as in the case of neighbor cell detection in LTE, makes itself dependent on terminals for network configuration matters, the potential attack to the base stations is real.

In addition, simply relying on successful handovers as a verification of neighbor cell validity may not suffice, because neighbor relations and X2 interfaces may be established for other purposes than handovers, e.g., for inter-cell interference coordination (ICIC). Because handovers among such neighbor cells (interested in ICIC) may never be performed, leaves the neighbor relation unvalidated.

Accordingly, it would be desirable to provide devices, systems and methods for checking neighbor cell validity that avoid the afore-described problems and drawbacks.

SUMMARY

According to one exemplary embodiment, there is a method for determining whether a neighbor cell is a neighbor of a serving cell, wherein the serving cell and the neighbor cell belong to a same communication network that includes a user terminal served by the serving cell. The method includes receiving at a base station of the serving cell, via the user terminal, a first identity of the neighbor cell, a second identity of the neighbor cell, and a random number generated by a base station of the neighbor cell; sending, from the base station of the serving cell, a request to the base station of the neighbor cell, for establishing a neighbor relation, wherein the request includes the received random number; and obtaining at the base station of the serving cell a response from the base station of the neighbor cell in response to the request, the response indicating acceptance or denial of the neighbor relation.

According to another exemplary embodiment, there is a computer readable medium including computer executable instructions, wherein the instructions, when executed by a processor of a base station of a serving cell, determine whether a neighbor cell is a neighbor of the serving cell, where the serving cell and the neighbor cell belong to a same communication network that includes a user terminal served by the serving cell. The instructions include receiving at the base station of the serving cell, via the user terminal, a first identity of the neighbor cell, a second identity of the neighbor cell, and a random number generated by a base station of the neighbor cell; sending, from the base station of the serving cell, a request to the base station of the neighbor cell, for establishing a neighbor relation, wherein the request includes the received random number; and obtaining at the base station of the serving cell a response from the base station of the neighbor cell in response to the request, the response indicating acceptance or denial of the neighbor relation.

According to still another exemplary embodiment, there is a base station of a serving cell configured to determine whether a neighbor cell is a neighbor of the serving cell, wherein the serving cell and the neighbor cell belong to a same communication network that includes a user terminal served by the serving cell. The base station includes a transceiver configured to receive, via the user terminal, a first identity of the neighbor cell, a second identity of the neighbor cell, and a random number generated by a base station of the neighbor cell; a processor connected to the transceiver and configured to send a request to the base station of the neighbor cell, for establishing a neighbor relation, wherein the request includes the received random number; and the processor being further configured to receive a response from the base station of the neighbor cell in response to the request, the response indicating acceptance or denial of the neighbor relation.

According to another exemplary embodiment, there is a method for determining whether a neighbor cell is a neighbor of a serving cell, where the serving cell and the neighbor cell belong to a same communication network that includes a user terminal served by the serving cell. The method includes receiving at a base station of the serving cell a first identity of the neighbor cell and a second identity of the neighbor cell; sending, from the base station of the serving cell, a request to a base station of the neighbor cell, for establishing a neighbor relation, wherein the request includes geographical information related to the serving cell; and receiving at the base station of the serving cell a response from the base station of the neighbor cell in response to the request, the response indicating acceptance or denial of the neighbor relation.

According to yet another exemplary embodiment, there is a method for determining whether a neighbor cell is a neighbor of a serving cell, where the serving cell and the neighbor cell belong to a same communication network that includes a user terminal served by the serving cell. The method includes sending from a base station of the neighbor cell first and second identities to the user terminal; generating at the base station of the neighbor cell a first random number; sending from the base station of the neighbor cell the first random number to the user terminal; receiving at the base station of the neighbor cell, from a base station of the serving cell, a request to establish a neighbor relation, wherein the request includes a second random number; verifying at the base station of the neighbor cell whether the second random number has been generated by the base station of the neighbor cell as the first random number; and informing the base station of the serving cell, based on a result of the verification, whether the neighbor relation is accepted or denied.

According to another exemplary embodiment, there is a method for determining whether a neighbor cell is a neighbor of a serving cell, where the serving cell and the neighbor cell belong to a same communication network that includes a user terminal served by the serving cell. The method includes sending from the base station of the neighbor cell first and second identities to the user terminal; receiving at the base station of the neighbor cell, from the base station of the serving cell, a request to establish a neighbor relation, wherein the request includes at least one of geographical information related to the serving cell and an age of the serving cell; verifying at the base station of the neighbor cell whether the geographical information indicates that a degree of proximity between the serving cell and the neighbor cell is greater than a predetermined or derived first threshold or the age of the serving cell is less than a predetermined or derived second threshold; and informing the base station of the serving cell, based on a result of the verification, whether the neighbor relation is accepted or denied.

According to still another exemplary embodiment, there is a computer readable medium including computer executable instructions, wherein the instructions, when executed by a processor of a base station serving the neighbor cell, determine whether the neighbor cell is a neighbor of a serving cell, wherein the serving cell and the neighbor cell belong to a same communication network that includes a user terminal served by the serving cell. The instructions include sending from the base station of the neighbor cell first and second identities to the user terminal; generating at the base station of the neighbor cell a first random number; sending from the base station of the neighbor cell the first random number to the user terminal; receiving at the base station of the neighbor cell, from a base station of the serving cell, a request to establish a neighbor relation, wherein the request includes a second random number; verifying at the base station of the neighbor cell whether the second random number has been generated by the base station of the neighbor cell as the first random number; and informing the base station of the serving cell, based on a result of the verification, whether the neighbor relation is accepted or denied.

According to still another exemplary embodiment, there is a base station that serves a neighbor cell, for determining whether the neighbor cell is a neighbor of a serving cell, wherein the serving cell and the neighbor cell belong to a same communication network that includes a user terminal served by the serving cell. The base station includes a transceiver configured to send first and second identities of the neighbor cell to the user terminal; a processor connected to the transceiver and configured to generate a first random number; the transceiver being further configured to send the first random number to the user terminal; the processor being further configured to receive from a base station of the serving cell a request to establish a neighbor relation, wherein the request includes a second random number; and the processor being further configured to verify whether the received second random number has been generated by the base station of the neighbor cell as the first random number, and to inform the base station of the serving cell, based on a result of the verification, whether the neighbor relation is accepted or denied.

LIST OF ABRREVIATIONS

3G $3^{rd}$ generation
3GPP $3^{rd}$ Generation Partnership Project
ANR Automatic Neighbor Relation
CPI Correctness Probability Index
CIPL Cell Identity PLMN Level
C-RNTI Cell Radio Network Temporary Identity
DL-SCH Downlink Shared Channel
eNB eNodeB
EPS Evolved Packet System
E-UTRA Evolved Universal Terrestrial Radio Access
GAD Geographical Area Description
GPS General Positioning System
ID Identity
IKE Internet Key Exchange
IKEv2 Internet Key Exchange version 2
IMEI International Mobile Equipment Identity
IMSI International Mobile Subscriber Identity
IPsec IP security (according to RFC 4301)
IP Internet Protocol
LTE Long Term Evolution
MCC Mobile Country Code
MCI Measurement Cell Identity
MME Mobility Management Entity
MNC Mobile Network Code
NDS Network Domain Security
OSS Operation Support System
PCI Physical Cell Identity
PLMN Public Land Mobile Network
RNC Radio Network Controller
RRC Radio Resource Control
RSRP Reference Signal Received Power
SA Security Association
SEGW Security Gateway
S-TMSI S-Temporary Mobile Subscriber Identity
SU Scheduling Unit
TS Technical Specification TSG Technical Study Group
UE User Equipment
UTRAN Universal Terrestrial Radio Access Network
VPN Virtual Private Network
WGS84 World Geodetic 1984
X2 The interface between two eNodeBs in LTE.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of LTE systems described above. However, the embodiments to be discussed next are not limited to these systems but may be applied to other existing or future telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 7:
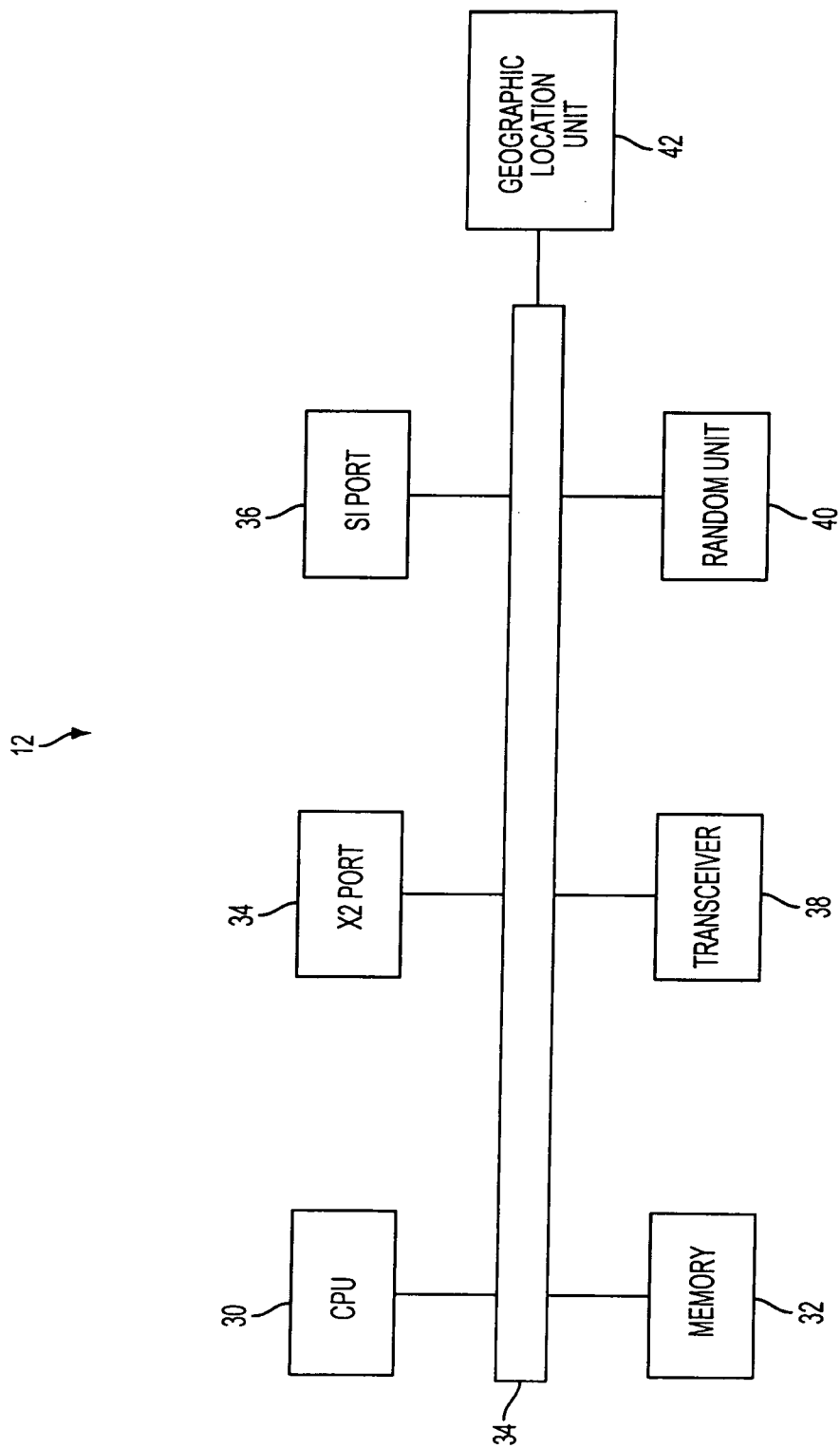
FIG. 7 is a schematic diagram illustrating a structure of the base station according to an exemplary embodiment.

As shown in FIG. 7, according to an exemplary embodiment, an eNB 12 may include a general purpose or dedicated processor 30 that is connected to a memory 32 via a bus 34. The processor 30 may be configured to perform required encoding, decoding and other communication related tasks as would be recognized by those skills in the art. eNB 12 may also include an X2 port 34 and an S1 port 36 that facilitate the communication among eNBs via the X2 and S1 interfaces. eNB 12 may also include an antenna or an array of antennas 38 for communicating with the terminals. According to an exemplary embodiment, eNB 12 may include a random unit 40 that generates random number periodically and either inserts the random numbers into a signal emitted by the antenna 38 or provides the random number to the processor 30. Further, eNB 12 may include a geographic location unit that stores geographical information of the eNB 12 and its served cells and may encode this information into a message that is transmitted from X2 port 34 or S1 port 36 or provide this information to the processor 30. In another exemplary embodiment, the processor 30 alone or in combination with the memory 32 may perform one or all of the functions of the random unit 40 and the geographic location unit 42.

According to an exemplary embodiment, a novel mechanism that prevents a first threat, i.e., the previously discussed CIPLs that are collected by a terminal and later injected elsewhere into the network, is discussed next. According to this exemplary embodiment, each eNB is configured to generate a random number R. eNB is configured to include this random number R in the system information broadcasted in a served cell. The random number may be periodically and randomly changed. The random number may be included in the same system information scheduling unit (SU) as the PLMN ID and CIPL, i.e., SU-1 (which is the most frequently scheduled SU) carried on Downlink Shared Channel (DL-SCH). eNB may be also configured to remember (or store in the memory 32) all the random numbers that were broadcast during a given past period of time of length $T_W$ (i.e., the random numbers broadcast between $T_C$-$T_W$ and $T_C$, where $T_C$ is a current time).

According to an exemplary embodiment, the random number of a base station may change at least once in a $T_W$ time period and may change often as every time it is broadcast, e.g., every time SU-1 is broadcast. One possible, reasonable, size of the random number may be between 6 and 20 bits. If a value tag is introduced in the channel information to indicate changes of the information in SU-1, this mechanism may disregard changes in the random number for the reasons discussed next. A value tag indicates whether a characteristic, parameter or other feature in the system information (or part of the system information) has changed, so that a user terminal quickly can determine if it needs to receive all the system information or part of the system information. For example, if the user terminal stores the system information from its last reception and the value tag indicates that the system information is unchanged, the user terminal does not need to receive the rest of the system information and may rely on the already stored system information. However, the value tag mechanism is not intended for information that changes as frequently as the random number may change in the exemplary embodiments. For this reason, the value tag mechanism may not indicate that the random number has changed.

Thus, according to this exemplary embodiment, one or more base stations (preferably each base station) include a base station generated random number $R_i$, where "i" identifies one base station among the plurality of existing base stations, into the broadcast system information. When the terminal reads the broadcast system information from a neighbor cell and reports the PLMN ID and CIPL of the detected neighbor cell, in response to a request from its serving eNB, the terminal includes also the random number R of the detected neighbor cell at that time in the report. A neighbor cell is defined as a cell adjacent to the serving cell, such that a terminal at the border area between the two cells can receive transmissions in both cells.

Figure 5:
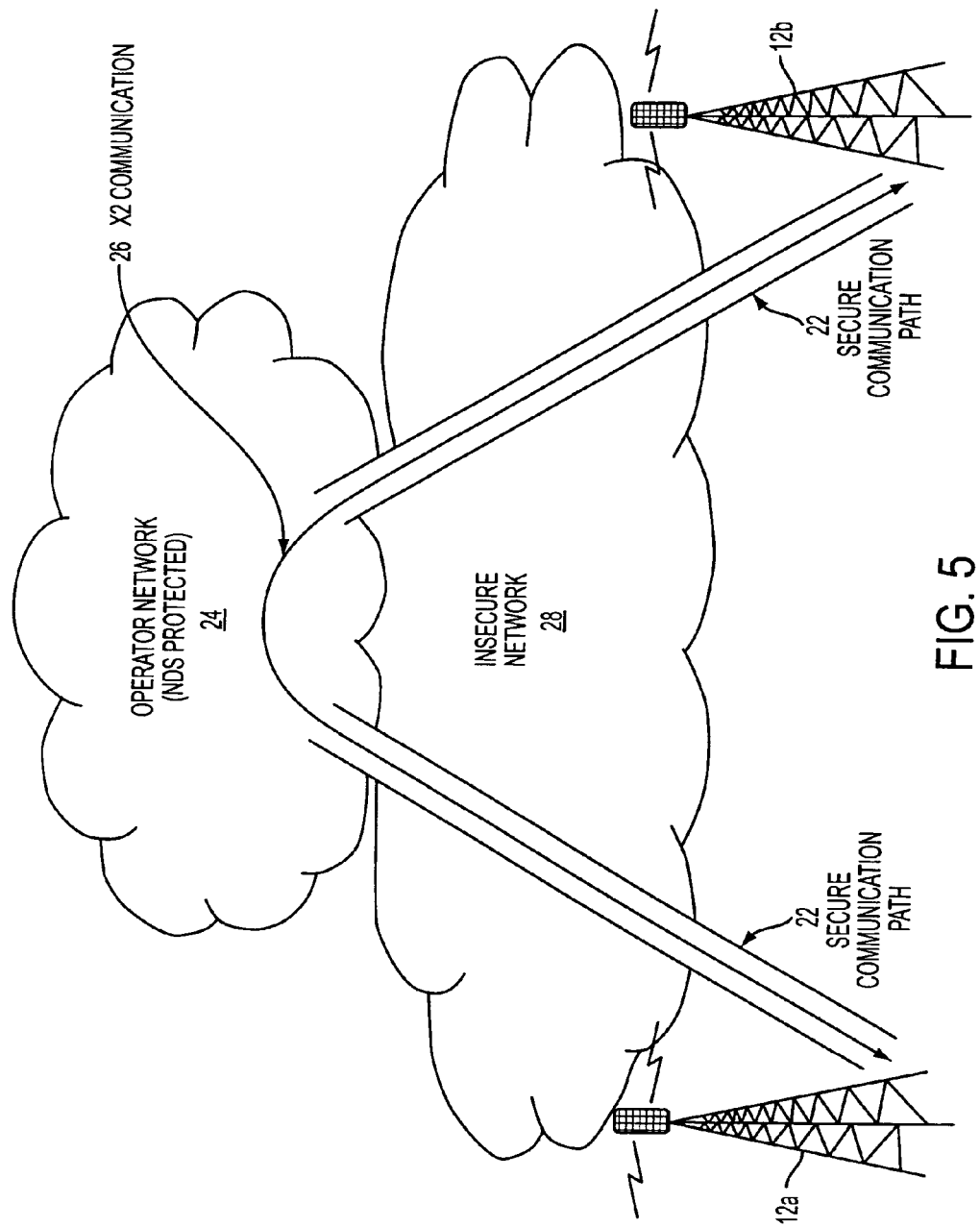
FIG. 5 is a schematic diagram illustrating establishing a secure communication between two base stations.
Figure 6:
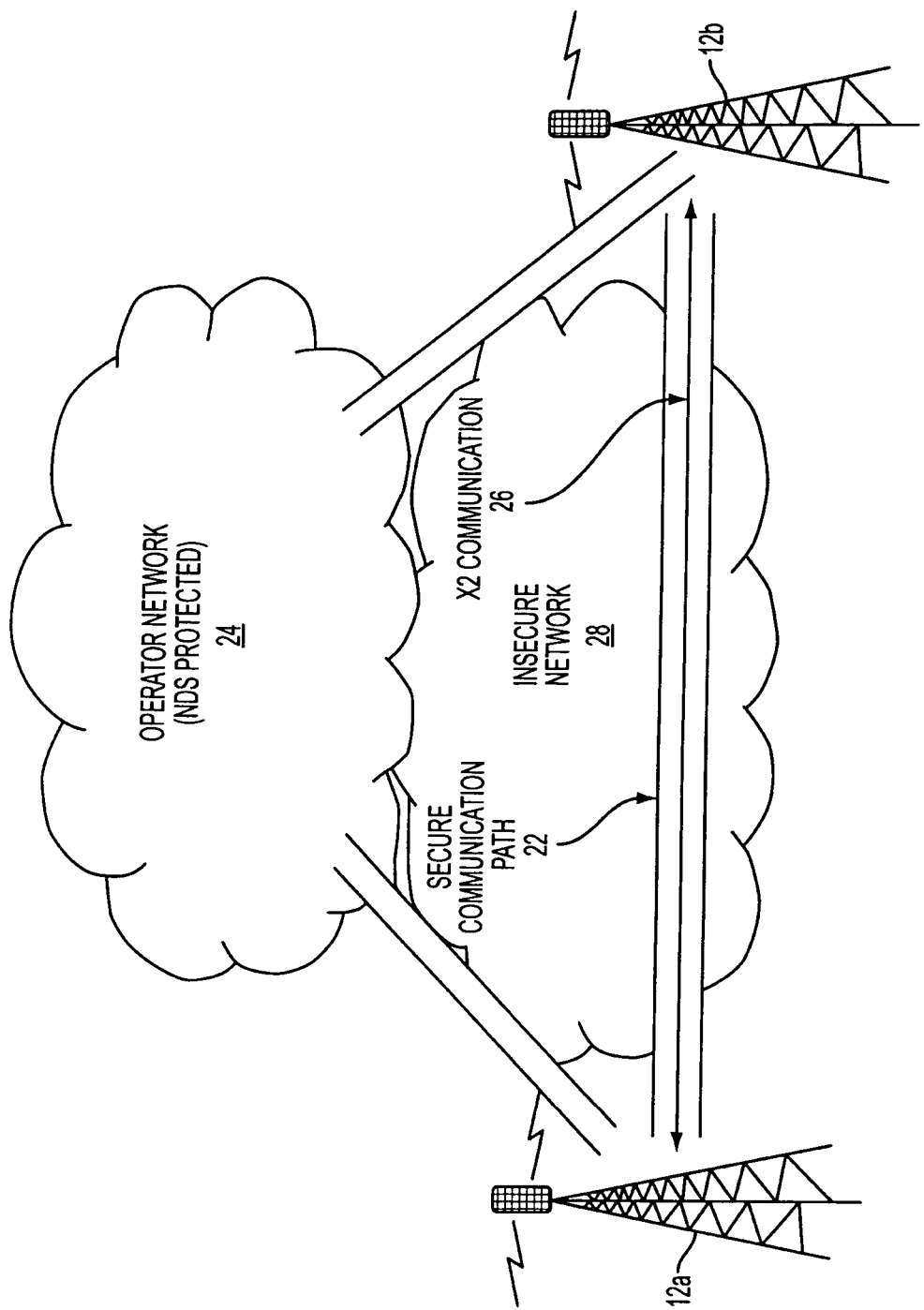
FIG. 6 is a schematic diagram illustrating establishing a direct secure communication between two base stations.

The serving eNB contacts the eNB of the detected neighbor cell, for which the random number R has been received, to establish the neighbor relation and, if this is the first cell neighbor relation between the two eNBs, the X2 interface. The serving eNB transmits the reported random number to the neighbor eNB either via the operator's NDS protected network (as illustrated in FIG. 5) or directly to the neighbor eNB (as illustrated in FIG. 6). However, even in scenarios where direct eNB-eNB X2 communication is possible (as illustrated in FIG. 6), eNBs are still assumed to most commonly make the initial contact via the operator's network, so that the validity of the neighbor relation may be verified before dedicated IPsec SAs and a direct eNB-eNB connection are established as possible optimization.

The neighbor eNB compares the received random number with the ones that it has broadcast during the last $T_W$ time window. If a match is found, the information reported from the terminal to the serving eNB is considered as truly originating from the neighbor eNB and fresh enough to make it credible that the reporting user terminal has not unaided been able to retrieve the information from a cell that is not a neighbor of the serving cell. Based on this verification, the neighbor list is updated in each base station to include the detected cell. Each base station may store its own neighbor list. Alternatively, or in addition, the neighbor list may be stored in a central location to be accessible to the management unit.

According to another exemplary embodiment, a novel mechanism that prevents a second threat, i.e., the collected CIPLs being conveyed to a remote location to be injected into the network in real-time, is discussed next.

According to this exemplary embodiment, the serving eNB, prior to determining whether to establish a neighbor relation to a new cell or eNB, sends to the detected new neighbor base station geographical information related to the serving cell. The geographical information related to the serving cell may be the antenna position (or an estimated mean position of a distributed antenna) or an estimated center position of the concerned cell. The position may be represented by the longitude and latitude of a physical position, as generated by a GPS system for example (i.e., according to the World Geodetic System 1984 (WGS84)). The geographical information related to the serving cell may also be an area (or volume), e.g., representing an estimated coverage area (or coverage volume) of the serving cell.

The neighbor eNB compares the received geographical information of the serving cell or eNB with corresponding geographical information related to the neighbor cell (e.g., a position or an area) to determine whether it is geographically "reasonable" that the serving cell and the neighbor cell are neighbors (e.g., by determining a relative position or by comparing coverage areas). If the relation between the respective geographical information of the two cells (e.g., the relative position of the serving cell in relation to the position of the detected neighbor cell) is considered to be "reasonable," the neighbor relation request is accepted (unless there is some other restriction that prevents it). Optionally, when accepting the neighbor relation, the eNB of the neighbor cell may send geographical information related to the neighbor cell to the eNB of the serving cell, so that the eNB of the serving cell also has the possibility to reject the neighbor relation based on geographical considerations. Each of the mechanisms described in this exemplary embodiment and the mechanisms related to the random number discussed above may be implemented as a stand alone mechanism. However, these mechanisms may be combined as discussed next.

Figure 1:
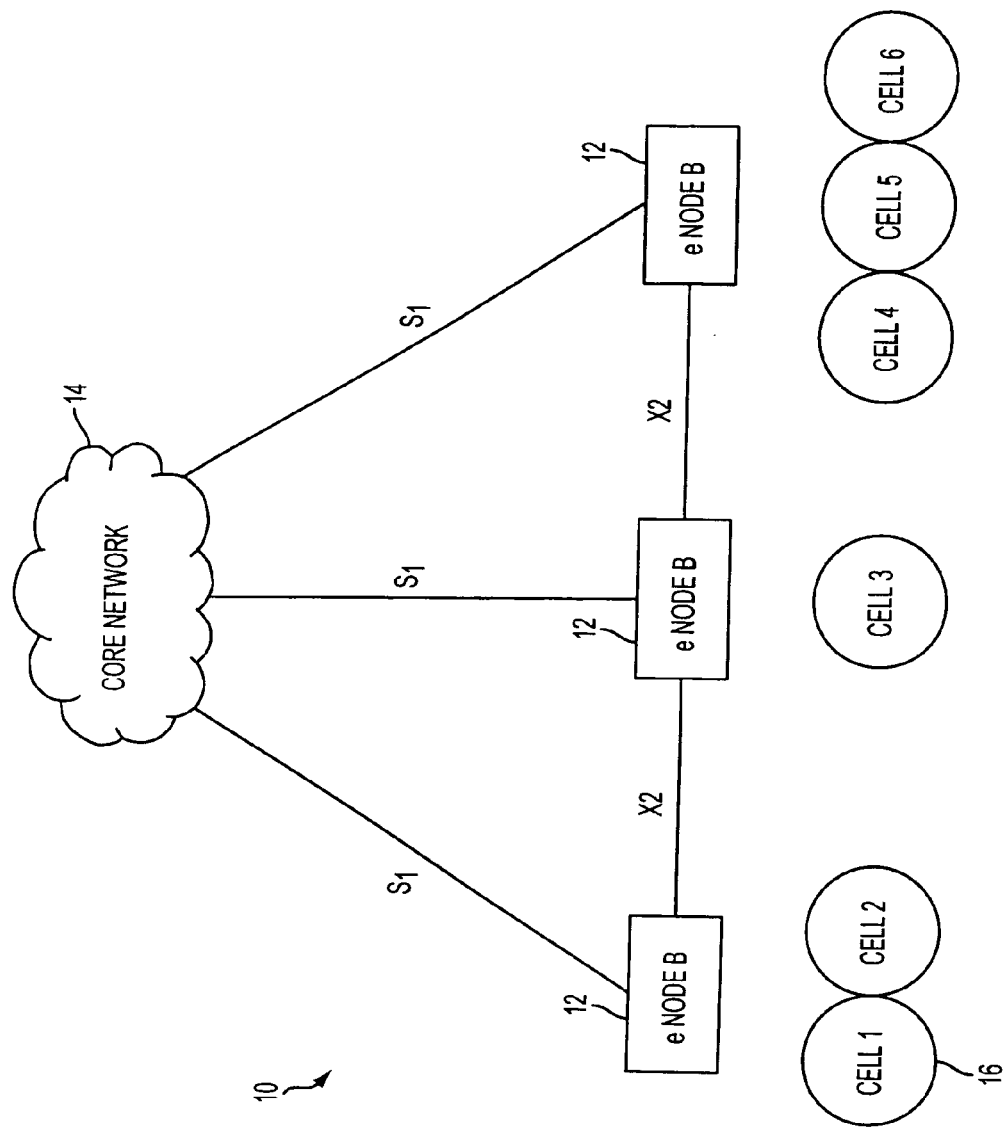
FIG. 1 is a schematic diagram of a communication system including multiple base stations and cells.
Figure 2:
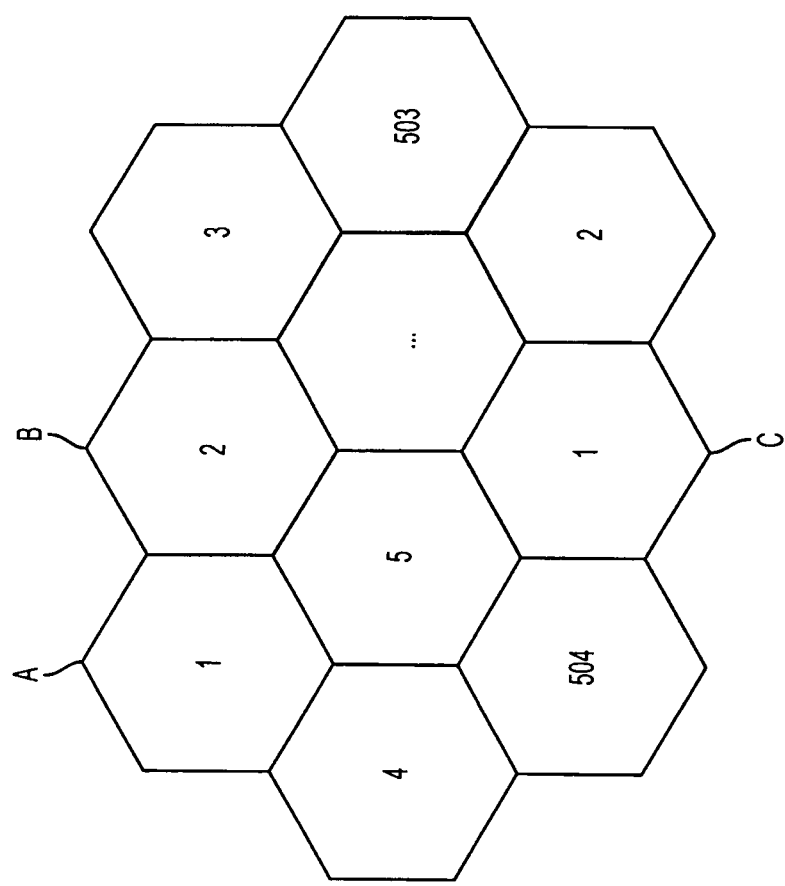
FIG. 2 is a schematic diagram of a plurality of cells in a communication network that are reusing their cell identities.
Figure 3:
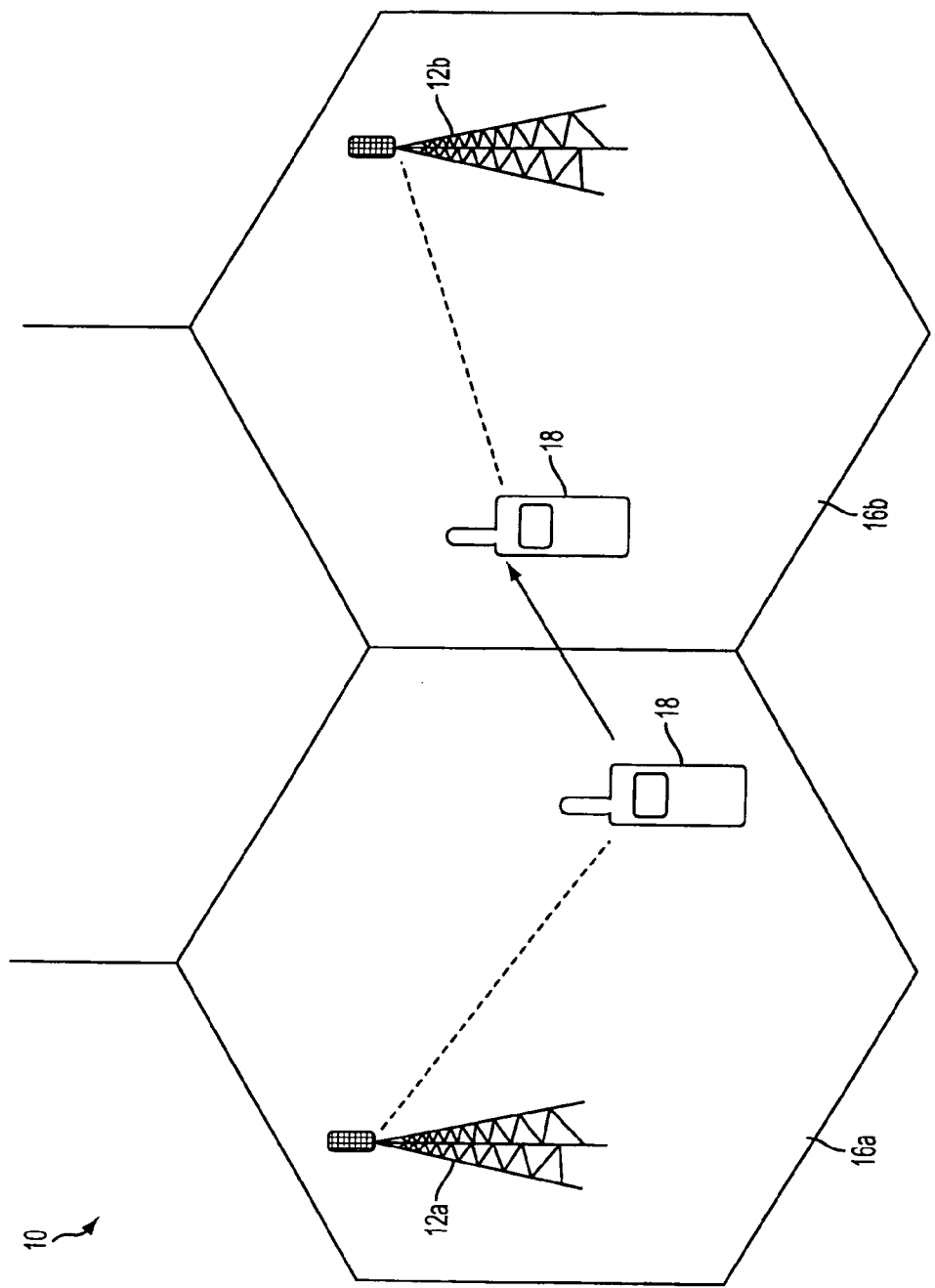
FIG. 3 is a schematic diagram of a terminal that travels from a first cell to a neighbor cell.
Figure 4:
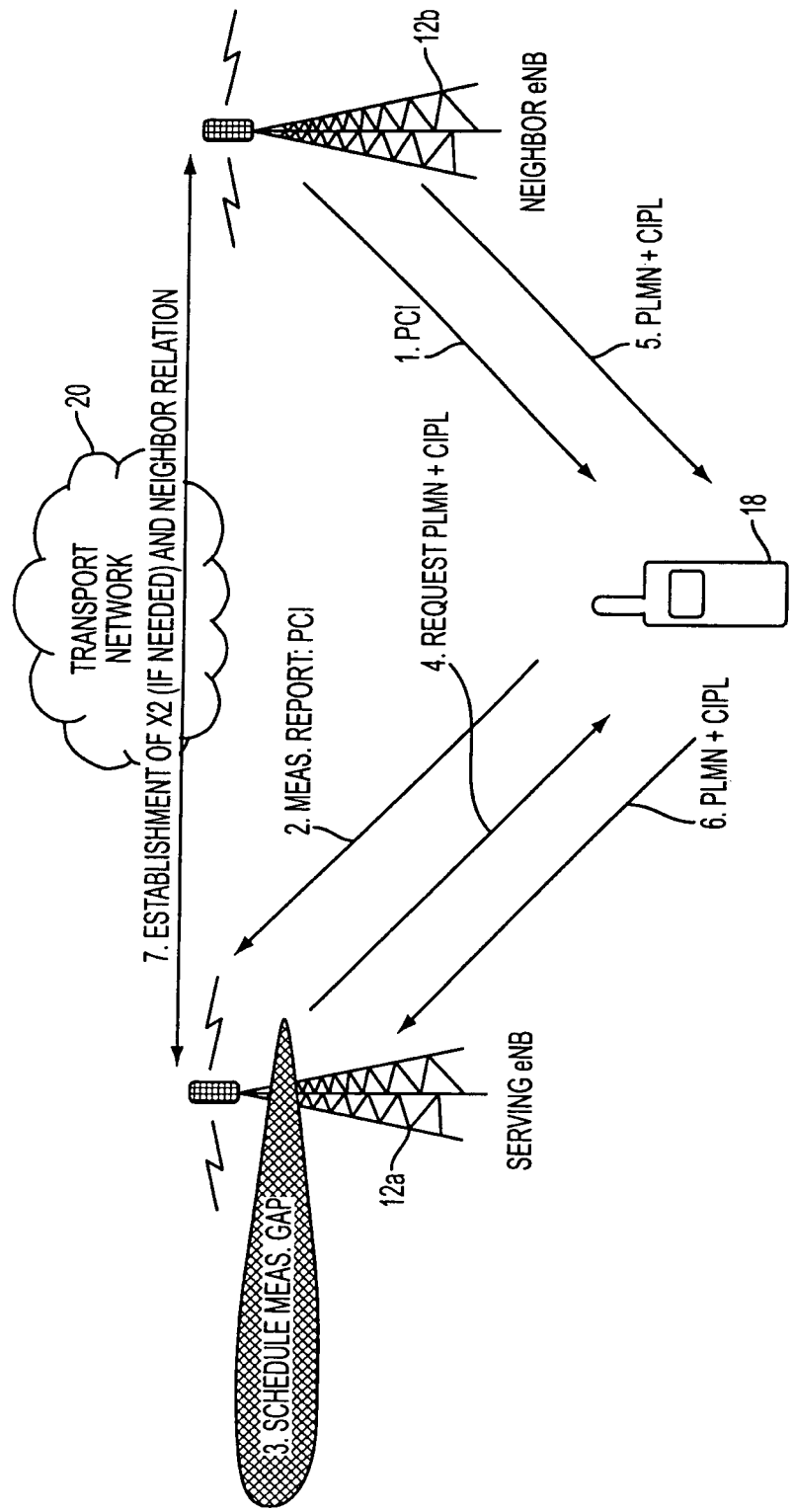
FIG. 4 is a schematic diagram that illustrates communication steps between base stations and the terminal.
Figure 8:
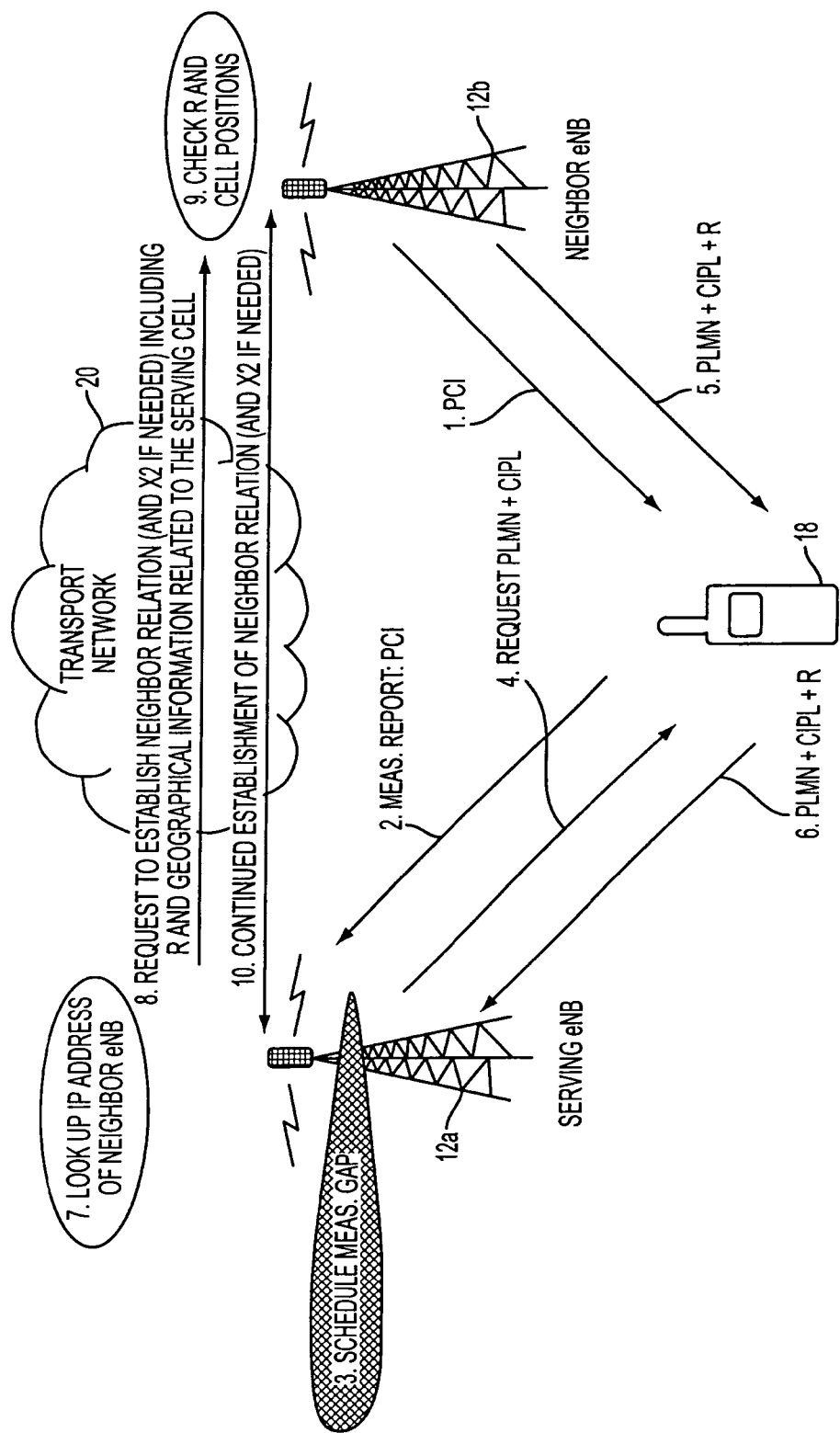
FIG. 8 is a schematic diagram illustrating communication steps between the base stations and the terminal according to an exemplary embodiment.

In this regard, the procedure for implementing the random number mechanism and the geographical information mechanism is discussed with regard to FIG. 8. In step 1, terminal 18 determines the PCI of the neighbor cell served by eNB 12*b*. In step 2, terminal 18 forwards the PCI information to the serving eNB 12*a*. As discussed with reference to FIG. 4, serving eNB 12*a* may schedule a measurement gap (also known as transmission gap) in step 3 for terminal 18 to retrieve more parameters of neighbor cell. An alternative to step 3 is that the serving eNB orders (or has previously ordered) the terminal 18 to enter a DRX mode with sufficiently long periods of no transmission receptions in the serving cell to allow retrieval of the PLMN ID and CIPL of a neighbor cell. In step 4, serving eNB 12*a* instructs terminal 18 to obtain the PLMN ID and CIPL and the random number R of neighbor cell of eNB 12*b*. In step 5, terminal 18 receives the PLMN ID, CIPL and R of neighbor cell of eNB 12*b* and forwards this information in step 6 to the serving eNB 12*a*. An alternative to steps 2, 4 and 6 is that the terminal 18, e.g., being in DRX mode reports the PCI, PLMN ID, CIPL and R of the neighbor cell served by eNB 12*b* without having previously reported the PCI of this neighbor cell to the serving eNB 12*a* and without having received a specific instruction from the serving eNB to retrieve and report the PLMN ID, CIPL and R of this particular neighbor cell. Next, the serving eNB 12*a* looks up in step 7 the IP address of neighbor eNB 12*b* serving the newly detected neighbor cell and in step 8, serving eNB 12*a* transmits a request to neighbor eNB 12*b* to establish neighbor relation. An alternative to steps 7 and 8 is that the serving eNB 12*a* sends the request to neighbor eNB 12*b* via one or more MME(s), in which case an MME looks up the IP address of the neighbor eNB 12*b*. The request may include one or both of the random number R and the geographical information of the serving cell/node. The neighbor eNB 12*b* receives the requests and verifies whether R has been broadcast by itself within a certain recent time window. If no match is found between the received R and the stored broadcast R, no relation is established between the two eNBs, thus preventing an unnecessary neighbor relation.

However, if the neighbor eNB 12*b* matches the received R with one of the recently broadcast R, the neighbor base station checks the serving cell geographical information. An example for a recently broadcast R is provided later. If the geographical relation between the two cells is considered "unreasonable," then the neighbor eNB may also reject the neighbor relation with an appropriate cause value. The order in which the neighbor eNB 12*b* checks the random number R and the geographical information of the serving cell may be reversed or the two checks may be performed simultaneously. Alternatively, the method may include checking only one of the random number and the geographical information. In another exemplary embodiment, the eNBs may be configured to not reject the neighbor relation if one of the checks fails. Supposing for this exemplary embodiment that both checks are required and supposing that both checks are passed in the neighbor eNB 12*b*, the neighbor relation is established between the two eNBs in step 10. In another exemplary embodiment the eNB of the neighbor cell, when accepting the neighbor relation, may send geographical information related to the neighbor cell to the eNB of the serving cell, so that the eNB of the serving cell also has the possibility to reject the neighbor relation based on geographical considerations.

Because the determination of whether the geographical relation between the two cells is "reasonable" is an eNB internal matter, this determination may be implemented by using various algorithms, as determined by the operator. According to one exemplary embodiment, the implementation of this determination is based on simply accepting any position of the serving cell that lies within a certain distance D from the position of the detected neighbor cell (i.e., defining a circular acceptance area with radius D around the position of the detected neighbor cell).

The acceptance distance D may be configurable by the operator. The distance D may be adapted to a range a cell is expected to cover (e.g., different distances for micro and macro cells). According to another exemplary embodiment, the distance D may be custom determined for each cell, by taking into account the individual cell's surrounding environment (e.g., a cell surrounded by high buildings and a cell covering the shore of a lake will have very different distances to their respective most remote potential neighbors). According to an exemplary embodiment, other definitions of an acceptance area are possible, e.g., an ellipse (which may correspond better than a circle to the shape of some cells) or an irregular shape defined by a polygon surrounding the cell center. In this regard, 3GPP TS 23.032 v7.0.0, "3rd Generation Partnership Project; Technical Specification Group Services and System Aspects; Universal Geographical Area Description (GAD) (Release 7)", June 2006, the content of which is incorporated here by reference, discloses more definitions of areas, the geometric shapes, and the encodings of these shapes, which may be used for definitions of acceptance areas.

Various exemplary embodiments that may improve the mechanism illustrated in FIG. 8 are discussed next. The geographic information may be somewhat a fuzzy indication of spatial reasonability. Because the acceptable geographic area has to be large enough to accommodate all true neighbors, in many cases it would be unavoidable that some cells in the furthest part of the acceptance area, which are not actual neighbors, would (at least in the case of cooperating terminals, i.e., the second of the above described threats) be incorrectly accepted as neighbors.

Thus, whether a cell is inside the acceptance area is not an absolute verification of correctness, but rather an indication that it is not likely that the neighbor report is faked, even if cooperating terminals are used. For example, the base station of the serving cell may send to the base station of the neighbor cell (or the other way around) geographical information that indicates that a degree of proximity between the serving cell and the neighbor cell is greater than a predetermined or derived threshold, i.e., that the serving cell and the neighbor cell are closer to each other than a predetermined or derived threshold. Note, however, that the phrase "degree of proximity" and the term "closer" as used in the previous sentence and elsewhere in this document are not intended to be limited to pure measures of distance and may include other aspects or characteristics which are used to determine proximity or closeness between the cells. One example of such threshold is discussed later. According to an exemplary embodiment, the confidence level of this indication may be improved by adding other measures, means or indications, which make it less probable that an incorrect neighbor is reported. One such measure is for example the "ages" of the involved cells, i.e., the elapsed time since the deployments of the respective cells.

Another measure to limit the vulnerability of the network is to block a certain terminal from triggering numerous neighbor validity tests in a short time. These two exemplary embodiments are discussed next. Each of these mechanisms may be used in conjunction with the mechanisms disclosed in the previously discussed embodiments or by itself.

The mechanism of using cell ages as a measure of probability of correctness leverages the fact that new neighbor relations are more likely to appear when a new cell has been deployed. Changed radio conditions, e.g., a building being torn down, may cause new neighbor relations to appear among old cells, but this is less likely than neighbor relations being formed among new cells. Thus, if both cells of a newly reported potential neighbor relation are old, this may be an indication that the neighbor relation is unnecessary and incorrectly reported. If also the geographical data of the two base stations implies that the reported detected neighbor cell is at the outskirt of the acceptance area, then these indications considered together may be enough to reject establishing the neighbor relation.

According to this embodiment, the serving eNB conveys the age of the serving cell, with or instead of the geographical information of the serving cell, to the neighbor eNB. The neighbor eNB determines whether the age of the serving cell alone or in combination with the geographical information is higher than a predetermined or derived threshold and based on this determination, rejects or not the establishment of a new neighbor relation between the two cells/base stations.

According to an exemplary embodiment, a "level of suspiciousness" may be derived based on a "suspiciousness index" $S_{geo}$ from the geographical data and another suspiciousness index from the cell ages $S_{age}$. Based on these two indexes, a total suspiciousness index $S_{tot}$ is defined as a sum of the other two indexes, i.e., $S_{tot}=S_{geo}+S_{age}$. The geographical suspiciousness index may be defined as a function of the inter-neighbor distance "d" (i.e., $f_{geo}(d)$). The cell age suspiciousness index may be defined as a function of the age of the youngest of the involved cells $a_{youngest}$ (i.e., $f_{age}(a_{youngest})$).

One possible definition of $f_{geo}(d)$ may be:

$$S_{geo} = f_{geo}(d) = \frac{c_1 \cdot S_{tot-threshold}}{D_{accept}} \cdot d \text{ for } 0 \le d \le D_{accept} \text{ and}$$

$$S_{geo} = f_{geo}(d) = c_1 \cdot S_{tot-threshold} \text{ for } d > D_{accept},$$

where $c_1$ is a constant.

In this definition, $D_{accept}$ represents the inter-neighbor acceptance distance. The $D_{accept}$ may in turn be derived from the expected ranges of the two involved cells, e.g., $D=R_{cells1}+R_{cell2}+M$, where $R_{cell1}$ is the expected range of cell 1, $R_{cell2}$ is the expected range of cell 2, and M is an additional margin. The constant $c_1$ may satisfy $0<c_1 \le 1$ with a typical value of $c_1=1$.

A possible definition of $f_{age}(A_{youngest})$ may be:

$$S_{age} = f_{age}(a_{youngest}) =$$
$$\frac{c_2 \cdot S_{tot-threshold}}{A_{dep-conv-time}} \cdot a_{youngest} \text{ for } 0 \le a_{youngest} \le A_{dep-conv-time}$$

and $$S_{age} = f_{age}(a_{youngest}) = c_2 \cdot S_{tot-threshold} \text{ for } a_{youngest} \ge A_{dep-conv-time},$$

where $c_2$ is another constant.

In this definition, $A_{dep\text{-}conv\text{-}time}$ represents an empirically derived typical neighbor relation convergence time after cell deployments, e.g., defined as the elapsed time after a cell deployment after which a fraction p of all neighbor relations have been established, where p could be for example 97%. The constant $c_2$ may satisfy $0 < c_2 \le 1$ with a typical value of $c_2 = 0.9$.

The higher the total suspiciousness index the more unwilling the eNBs are to accept the neighbor as correct. According to an exemplary embodiment, the reporting terminal may contribute with a "correctness probability index" CPI, to an "accumulated correctness probability index" $CPI_{ack}$. The correctness probability index may be defined as:

$$CPI = 1 - \frac{MAX(S_{tot}, S_{tot\text{-}threshold})}{S_{tot\text{-}threshold}}.$$

When the accumulated correctness probability index $$CPI_{ack} = \sum_i CPI_i \ge 1$$

(where $CPI_i$ is the CPI associated with the neighbor relation report from the $i^{th}$ terminal), then the neighbor relation may be accepted as correct (provided that the reported random numbers, if used, are correctly verified). The above definition of CPI implies that if the $S_{tot}$ of a reported detected neighbor is larger or equal to $S_{tot\text{-}threshold}$, then the report does not contribute to the accumulated correctness probability index $CPI_{ack}$.

Other definitions of the functions $f_{geo}$ and $f_{age}$ may be possible. For example, function $f_{geo}$ may be defined as follows:

$$S_{geo} = f_{geo}(d) = \frac{S_{tot\text{-}threshold}}{\pi/2} \cdot \arctan(c_3 \cdot d),$$

where $c_3$ is a constant that may be selected such that $f_{geo}(D_{accept}) = 0.9 \cdot S_{tot\text{-}threshold}$. This means that $$c_3 = \frac{\tan(0.9 \cdot \pi/2)}{D_{accept}} \approx \frac{6.3}{D_{accept}}.$$

Another possible definition of $f_{geo}$ may be:

$$S_{geo} = f_{geo}(d) = S_{tot\text{-}threshold} \cdot (1 - \exp(-c_4 \cdot d)),$$

where the constant $c_4$ may be selected such that $f_{geo}(D_{accept}) = 0.9 \cdot S_{tot\text{-}threshold}$, which means that $$c_4 = -\frac{\ln(1-0.9)}{D_{accept}} \approx \frac{2.3}{D_{accept}}.$$

Similarly, the function $f_{age}$ may be defined as $$S_{age} = f_{age}(a_{youngest}) = \frac{S_{tot\text{-}threshold}}{\pi/2} \cdot \arctan(c_5 \cdot a_{youngest})$$

with the constant $c_5$ selected such that $f_{age}(A_{dep\text{-}conv\text{-}time}) = 0.8 \cdot S_{tot\text{-}threshold}$, i.e., with $$c_5 = \frac{\tan(0.8 \cdot \pi/2)}{A_{dep\text{-}conv\text{-}time}} \approx \frac{3.1}{A_{dep\text{-}conv\text{-}time}}, \text{ or}$$

$$S_{age} = f_{age}(a_{youngest}) = S_{tot\text{-}threshold} \cdot (1 - \exp(-c_6 \cdot a_{youngest})),$$

with the constant $c_6$ selected such that $f_{age}(A_{dep\text{-}conv\text{-}time}) = 0.8 \cdot S_{tot\text{-}threshold}$, i.e., with $$c_6 = -\frac{\ln(1-0.8)}{A_{dep\text{-}conv\text{-}time}} \approx \frac{1.6}{A_{dep\text{-}conv\text{-}time}}.$$

According to another exemplary embodiment, a terminal that appears to misbehave may be blocked to prevent that the terminal causes extended damage to the neighbor relation configuration. Thus, the terminal labeled as misbehaving has the reported allegedly detected neighbor cell prevented from being accepted by the network.

The blocking mechanism may become active when the same terminal reports potential neighbor relations (although not necessarily the same neighbor cell) which are rejected k times, e.g. in a row or with some legitimate neighbor reports in between, by the base station of the serving cell and/or the base station of the neighbor cell. The parameter k may be an integer equal or larger than 1. A preferred value for a quick and efficient blocking is k=1. To avoid blocking a terminal which reports a true potential neighbor cell, which is incorrectly rejected by the network, e.g., due to malconfigured geographical data, a value of k>1, e.g., k=2 or k=3 may be selected. Other values for this parameter are also possible.

A terminal that satisfies the above condition triggers the blocking mechanism and is therefore added to a terminal neighbor reporting blacklist. The blacklisting may be preferably based on the International Mobile Subscriber Identity (IMSI) of the user of the terminal (i.e., the IMSI is what is stored in the blacklist). This requires that the IMSI is included in the terminal context data that the serving Mobility Management Entity (MME) transfers to the eNB in the INITIAL CONTEXT SETUP REQUEST message, which is stored in the eNB. Alternatives include basing the blacklisting on the IMEI, which then may be included in the terminal context data transferred from the MME, on the S-Temporary Mobile Subscriber Identity S-TMSI or the Cell Radio Network Temporary Identity C-RNTI. According to another exemplary embodiment, combinations of any of the above noted identities are also possible blacklist contents.

The blacklisting may be temporary, such that a blacklisted terminal is removed from the blacklist after a predetermined time. This serves at least two purposes. First, temporarily misbehaving terminals are not blocked from contributing to the neighbor relation build-up functionality for ever. If a misbehaving terminal is, for instance, hijacked by malicious software and later cleaned from this malicious software, then it is beneficial that the cleaned terminal may contribute to the ANR functionality again. Secondly, making the blacklisting temporary simplifies the blocking functionality, because the data related to the blacklisting is not required to permanently be stored in the network.

According to an exemplary embodiment, the terminal blacklist may be maintained centrally, e.g., in a management entity such as an Operation Support System (OSS). Then, eNBs may report terminals to be blacklisted to the OSS and the OSS may distribute blacklist updates to the eNBs. Alternatively, instead of distributing the blacklist to all eNBs, the eNBs may send requests to the OSS (or other central blacklist sever) to check certain terminals against the current blacklist.

Although the blacklist may be maintained centrally, e.g., in the OSS, according to another exemplary embodiment the blacklist in maintained in the eNBs. The eNBs may exchange the blacklist information among each other. However, this kind of arrangement may be complex as the amount of communication among the base stations is increased. Another possibility that prevents a cell from being overloaded with injections of false neighbors from the same terminal is to keep the blacklist functionality local in each eNB. Thus, the functionality for temporary, eNB-local blacklisting of terminals reporting non-verifiable neighbors may be implemented at each base station.

If the fuzzy heuristics based on suspiciousness assessments is used as described above, then the terminals to be blacklisted are those which report allegedly detected neighbors with a total suspiciousness index $S_{tot}$, equal to or exceeding the threshold value defined by $S_{tot\text{-}threshold}$ (i.e., $S_{tot} \geq S_{tot\text{-}threshold}$). In other words, the terminals having neighbor reports associated with a correctness probability index CPI of zero (i.e., CPI=0) may be blacklisted.

The terminal blacklisting described in these exemplary embodiments may be seen as a further denial-of-service prevention because it limits the network's effort in identifying fake neighbor reports. According to an exemplary embodiment, the novel neighbor relation validation test described in FIG. 8, requires that the detecting eNB 12a (i.e., the eNB serving the reporting terminal) contacts the detected eNB 12b (i.e., the eNB serving the allegedly detected neighbor cell) before the fraud may be determined. Having the terminal blacklisting, this inter-eNB communication may be avoided except for the first falsely reported neighbor from a malicious terminal. An eNB will not request a blacklisted terminal to read and report the CIPL and PLMN ID of a detected cell and if the blacklisted terminal were to send an unsolicited such report, the serving eNB would ignore it.

According to another exemplary embodiment, local and/or temporary use of neighbor validation may be used. Assuming that the novel mechanisms discussed above are used in conjunction with new deployments of one or more cells, the inclusion of the random number in the system information may be allowed to be dynamic. An operator may, for instance, choose to include the random number in the system information broadcast in the cells located in a certain area around a new deployment for some time until no more new neighbors are found. Otherwise, the random number may be omitted. Also, the presence or non-presence of the random number in the system information may be indicated by a single bit.

According to another exemplary embodiment, standalone, non-random number based mechanisms may be implemented as discussed next. Mechanisms that are not based on a random number broadcast in the system information of the cells (i.e., blacklisting, geographical and age based correctness probability assessment) may be used as stand-alone mechanism, without or independently of the random number based mechanism. In this regard, various methods for implementing the random number, the geographical position and the age of the cells are discussed next. These methods are not exhaustive but only exemplary.

Figure 9:
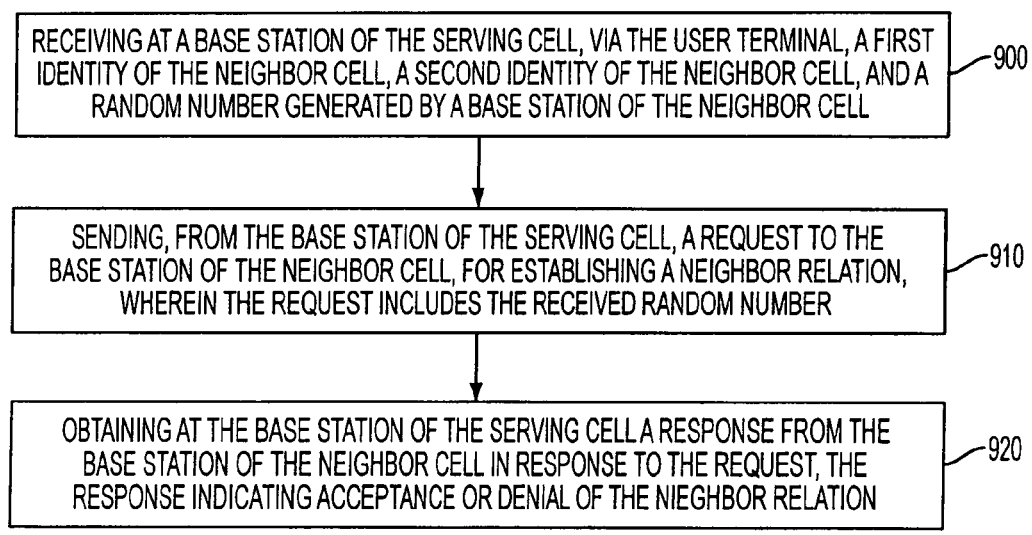
FIG. 9 is a flow diagram illustrating how a base station of a serving cell establishes a connection with a base station of a neighbor cell based on a first parameter according to an exemplary embodiment.

According to one exemplary embodiment shown in FIG. 9, there is a method for determining whether a neighbor cell is a neighbor of a serving cell, wherein the serving cell and the neighbor cell belong to a same communication network that includes a user terminal served by the serving cell. The method includes a step 900 receiving at a base station of the serving cell, via the user terminal, a first identity of the neighbor cell, a second identity of the neighbor cell, and a random number generated by a base station of the neighbor cell, a step 910 of sending, from the base station of the serving cell, a request to the base station of the neighbor cell, for establishing a neighbor relation, where the request includes the received random number, and a step 920 of obtaining at the base station of the serving cell a response from the base station of the neighbor cell in response to the request, the response indicating acceptance or denial of the neighbor relation. As an alternative to step 900, the eNB of the serving cell may receive the first and second identities and the random number of the neighbor cell as two different reports from the user terminal in the serving cell.

Figure 10:
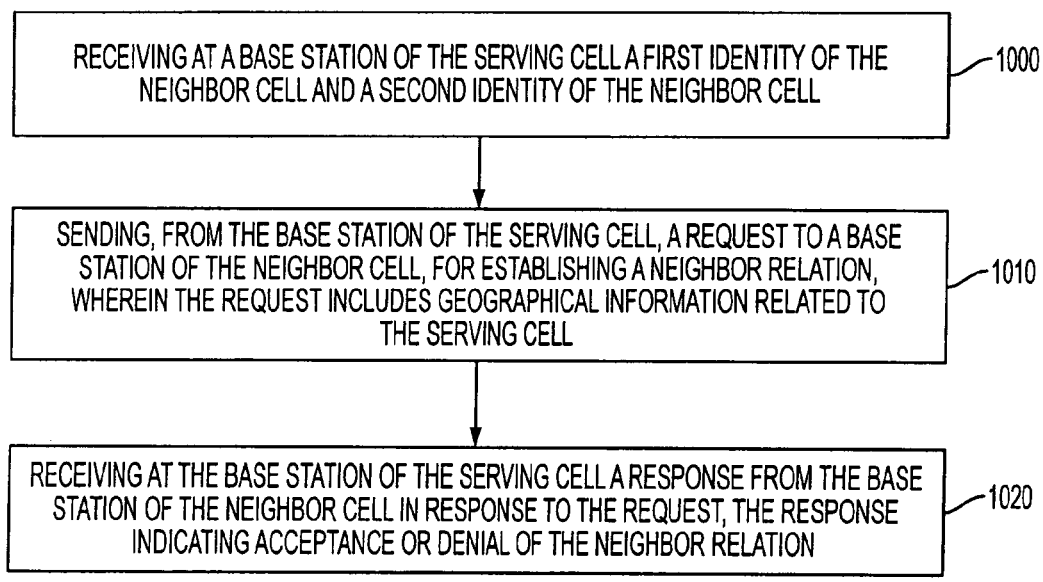
FIG. 10 is a flow diagram illustrating how a base station of a serving cell establishes a connection with a base station of a neighbor cell based on a second parameter according to an exemplary embodiment.

According to another exemplary embodiment shown in FIG. 10, there is a method for determining whether a neighbor cell is a neighbor of a serving cell, where the serving cell and the neighbor cell belong to a same communication network that includes a user terminal served by the serving cell. The method includes a step 1000 of receiving at a base station of the serving cell a first identity of the neighbor cell and a second identity of the neighbor cell, a step 1010 of sending, from the base station of the serving cell, a request to a base station of the neighbor cell, for establishing a neighbor relation, where the request includes geographical information related to the serving cell, and a step 1020 of receiving at the base station of the serving cell a response from the base station of the neighbor cell in response to the request, the response indicating acceptance or denial of the neighbor relation. As an alternative to step 1000, the eNB of the serving cell may receive the first and second identities of the neighbor cell as two different reports from the user terminal in the serving cell.

Figure 11:
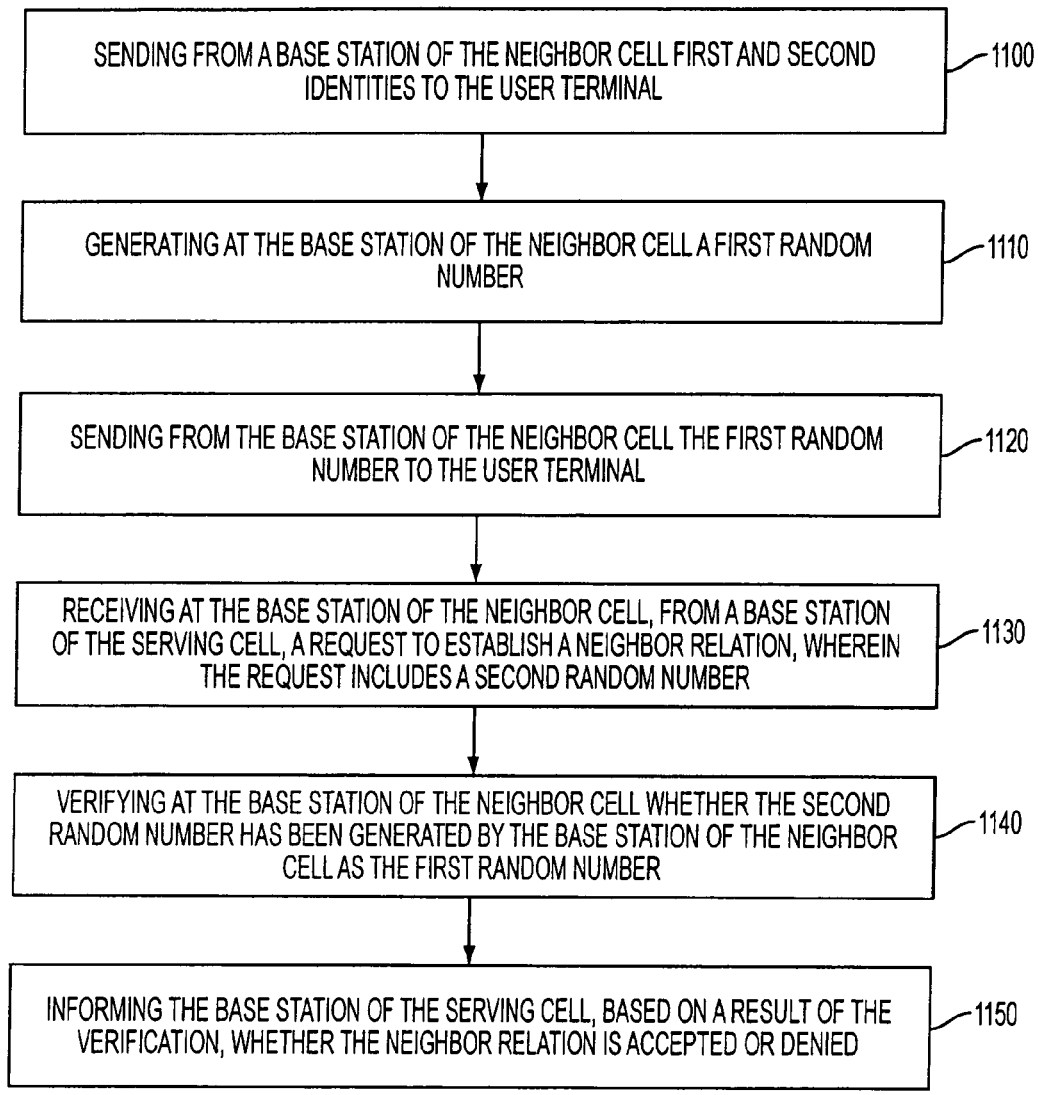
FIG. 11 is a flow diagram illustrating how a base station of a neighbor cell establishes a connection with a base station of a serving cell based on the first parameter according to an exemplary embodiment.

According to another exemplary embodiment shown in FIG. 11, there is a method for determining whether a neighbor cell is a neighbor of a serving cell, wherein the serving cell and the neighbor cell belong to a same communication network that includes a user terminal served by the serving cell. The method includes a step 1100 of sending from a base station of the neighbor cell first and second identities to the user terminal, a step 1110 of generating at the base station of the neighbor cell a first random number, a step 1120 of sending from the base station of the neighbor cell the first random number to the user terminal, a step 1130 of receiving at the base station of the neighbor cell, from a base station of the serving cell, a request to establish a neighbor relation, wherein the request includes a second random number, a step 1140 of verifying at the base station of the neighbor cell whether the second random number has been generated by the base station of the neighbor cell as the first random number, and a step 1150 of informing the base station of the serving cell, based on a result of the verification, whether the neighbor relation is accepted or denied.

Figure 12:
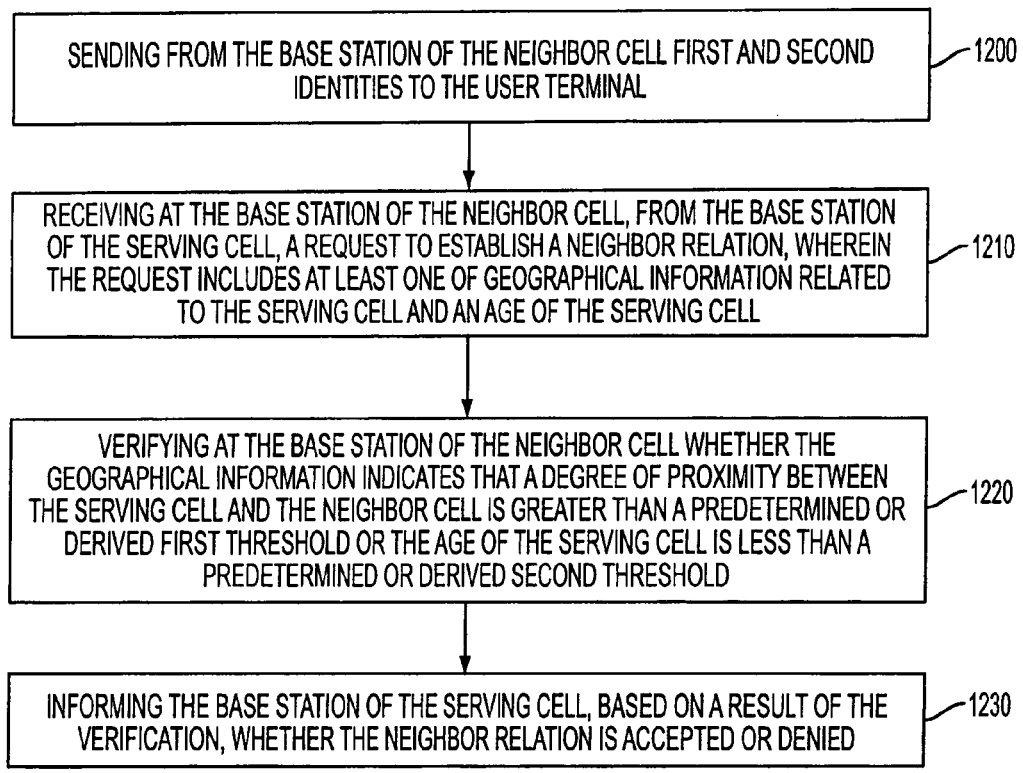
FIG. 12 is a flow diagram illustrating how a base station of a neighbor cell establishes a connection with a base station of a serving cell based on the second parameter according to an exemplary embodiment.

According to another exemplary embodiment shown in FIG. 12, there is a method for determining whether a neighbor cell is a neighbor of a serving cell, wherein the serving cell and the neighbor cell belong to a same communication network that includes a user terminal served by the serving cell. The method includes a step 1200 of sending from the base station of the neighbor cell first and second identities to the user terminal, a step 1210 of receiving at the base station of the neighbor cell, from the base station of the serving cell, a request to establish a neighbor relation, where the request includes at least one of geographical information related to the serving cell and an age of the serving cell, a step 1220 of verifying at the base station of the neighbor cell whether the geographical information indicates that a degree of proximity between the serving cell and the neighbor cell is greater than a predetermined or derived first threshold or the age of the serving cell is less than a predetermined or derived second threshold, and a step 1230 of informing the base station of the serving cell, based on a result of the verification, whether the neighbor relation is accepted or denied.

An advantage of using one or a combination of these mechanisms, independently of the random number based mechanism, is that no additional data has to be included in the system information that is broadcast in a cell. A disadvantage is that less efficient and less accurate assessments of the legitimacy of the reported neighbor relations may be achieved.

In one or all exemplary embodiments in which the eNB of the neighbor cell bases its decision to accept or reject the neighbor relation entirely or partly on geographical information related to the serving cell, an optional step may be added where the eNB of the neighbor cell, when accepting the neighbor relation, sends geographical information related to the neighbor cell to the eNB of the serving cell, so that the eNB of the serving cell also has the possibility to reject the neighbor relation based on geographical considerations.

When only the mechanism based on geographical cell data is used, a further advantage is that this implementation may be realized in a way that needs support only in the detected eNB (i.e., the eNB of the detected cell). In a scenario in which the detecting eNB (i.e., the eNB serving the reporting terminal) does not support the mechanism, the detected eNB does not receive any geographical data from the detecting eNB. However, the detected eNB may receive the global cell identity (i.e., CIPL and PLMN ID) of the source cell. The detecting eNB may then use a mechanism similar to the one used in 3G Radio Network Controllers (RNCs) to translate cell identities to geographical coordinates as described for example in 3GPP TS 25.305 v8.0.0, "3rd Generation Partnership Project; Technical Specification Group Radio Access Network; Stage 2 functional specification of User Equipment (UE) positioning in UTRAN (Release 8)", December 2007, the entire content of which is incorporated here by reference. This translation may be realized through an eNB external server, e.g., in an MME or an OSS, or as only eNB internal functionality.

One or more advantages of some or all exemplary embodiments disclosed above are discussed now. The threats of malicious terminals, negatively interfering with neighbor detection and creation of neighbor lists in LTE, may be eliminated or removed; the establishment of neighbor relations between false neighbors may be prevented; potential Denial-of-Service attacks resulting from unnecessary IKE processing and establishment of secure X2 between non-neighbors is mitigated; the threat of isolation of a newly deployed eNB is counteracted; potential manipulations of the neighbor list creation by both a single terminal and multiple cooperating terminals are reduced; the disclosed mechanisms are lightweight and have a low impact on the involved entities; the random based number mechanism may be complemented with considerations of cell ages, thereby further improving the possibilities to assess the probability that a reported potential neighbor relation is correct or not; and blacklisting of misbehaving terminals may be added to further reduce the resources consumed in the network for assessment of false neighbors.

The disclosed exemplary embodiments provide a user terminal, a base station, a system, a method and a computer program product for preventing unnecessary neighbor relations among eNBs in a communication system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of a hardware-only embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The present exemplary embodiments may be implemented in a user terminal, a base station, and generally in a wireless communication network or system comprising both the user terminal and the base station. The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a radio frequency transceiver for use in the user terminal, the base station or any host computer. The user terminal may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claimed is:

1. A method for determining whether a neighbor cell is a neighbor of a serving cell, wherein the serving cell and the neighbor cell belong to a same communication network that includes a user terminal served by the serving cell, the method comprising:

receiving at a base station of the serving cell, via the user terminal, a first identity of the neighbor cell, a second identity of the neighbor cell, and a random number generated by a base station of the neighbor cell;

sending, from the base station of the serving cell, a request to the base station of the neighbor cell, for establishing a neighbor relation, wherein the request includes the received random number; and obtaining at the base station of the serving cell a response from the base station of the neighbor cell in response to the request, the response indicating acceptance or denial of the neighbor relation.

2. The method of claim 1, further comprising:
verifying in the base station of the serving cell whether the first identity is new.

3. The method of claim 1, further comprising:
providing the base station of the neighbor cell with at least one of geographical information related to the serving cell or an age of the serving cell such that the base station of the neighbor cell determines whether the serving cell is a true neighbor based on the random number and the geographical information and/or the age of the serving cell.

4. The method of claim 1, further comprising:
at the base station of the serving cell, receiving in the response from the base station of the neighbor cell geographical information related to the neighbor cell;

verifying at the base station of the serving cell that the received geographical information related to the neighbor cell indicates that a degree of proximity between the serving cell and the neighbor cell is greater than a predetermined or derived threshold; and the base station of the serving cell, accepting or denying the neighbor relation based on the result of the verification.

5. The method of claim 1, further comprising:
temporarily blocking the user terminal to report potential new neighbor cells when the user terminal reports k times the presence of new neighbor cells and the base station of the neighbor cell or the base station of the serving cell rejects k times corresponding neighbor relations, wherein k is a natural number equal to or larger than 1.

6. A base station of a serving cell configured to determine whether a neighbor cell is a neighbor of the serving cell, wherein the serving cell and the neighbor cell belong to a same communication network that includes a user terminal served by the serving cell, the base station comprising:

a transceiver configured to receive, via the user terminal, a first identity of the neighbor cell, a second identity of the neighbor cell, and a random number generated by a base station of the neighbor cell;

a processor connected to the transceiver and configured to send a request to the base station of the neighbor cell, for establishing a neighbor relation, wherein the request includes the received random number; and the processor being further configured to receive a response from the base station of the neighbor cell in response to the request, the response indicating acceptance or denial of the neighbor relation.

7. The base station of claim 6, wherein the processor is further configured to:
provide the base station of the neighbor cell with at least one of geographical information related to the serving cell or an age of the serving cell such that the base station of the neighbor cell determines whether the serving cell is a true neighbor based on the random number and the geographical information and/or the age of the serving cell.

8. The base station of claim 6, wherein the processor is further configured to:
receive in the response from the base station of the neighbor cell geographical information related to the neighbor cell;

verify that the received geographical information related to the neighbor cell indicates that a degree of proximity between the serving cell and the neighbor cell is greater than a predetermined or derived threshold; and accept or deny the neighbor relation based on the result of the verification.

9. The base station of claim 6, wherein the processor is further configured to:
temporarily block the user terminal to report potential new neighbor cells when the user terminal reports k times the presence of the new neighbor cells and the base station of the neighbor cell or the base station of the serving cell rejects k times corresponding neighbor relations, wherein k is a natural number equal or larger than 1.

10. A method for determining whether a neighbor cell is a neighbor of a serving cell, wherein the serving cell and the neighbor cell belong to a same communication network that includes a user terminal served by the serving cell, the method comprising:

sending from a base station of the neighbor cell first and second identities to the user terminal;

generating at the base station of the neighbor cell a first random number;

sending from the base station of the neighbor cell the first random number to the user terminal;

receiving at the base station of the neighbor cell, from a base station of the serving cell, a request to establish a neighbor relation, wherein the request includes a second random number;

verifying at the base station of the neighbor cell whether the second random number has been generated by the base station of the neighbor cell as the first random number and that the received second random number has been broadcast in the neighbor cell within a time-window of predetermined size ending at the time of verification; and informing the base station of the serving cell, based on a result of the verification, whether the neighbor relation is accepted or denied.

11. The method of claim 10, wherein the verifying step further includes verifying at the base station of the neighbor cell that the received second random number is one of a pre-determined number of the latest random numbers to be broadcast in the neighbor cell.

12. The method of claim 10, wherein the first identity is a physical cell identity (PCI) and the second identity is an identity that uniquely identifies the neighbor cell.

13. The method of claim 10, further comprising:
the base station of the neighbor cell sending geographical information related to the neighbor cell to the base station of the serving cell.

14. The method of claim 10, further comprising:
periodically changing at the base station of the neighbor cell the first random number; and
storing each transmitted random number.

15. A base station that serves a neighbor cell, for determining whether the neighbor cell is a neighbor of a serving cell, wherein the serving cell and the neighbor cell belong to a same communication network that includes a user terminal served by the serving cell, the base station comprising:
a transceiver configured to send first and second identities of the neighbor cell to the user terminal;
a processor connected to the transceiver and configured to generate a first random number;
the transceiver being further configured to send the first random number to the user terminal;
the processor being further configured to receive from a base station of the serving cell a request to establish a neighbor relation, wherein the request includes a second random number; and
the processor being further configured to verify whether the received second random number has been generated by the base station of the neighbor cell as the first random number, to verify that the received second random number has been broadcast in the neighbor cell within a time-window of predetermined size ending at the time of verification or as one of a predetermined number of the latest random numbers to be broadcast in the neighbor cell and to inform the base station of the serving cell, based on a result of the verification, whether the neighbor relation is accepted or denied.

16. The base station of claim 15, wherein the first identity is a physical cell identity (PCI) and the second identity is an identity that uniquely identifies the neighbor cell.

17. The base station of claim 15, wherein the processor is further configured to:
receive at least one of geographical information related to the serving cell or an age of the serving cell such that the processor of the base station of the neighbor cell determines whether the serving cell is a true neighbor based on the random number and the geographical information and/or the age of the serving cell.

18. The base station of claim 15, wherein the processor is further configured to:
send geographical information related to the neighbor cell to the base station of the serving cell.

19. The base station of claim 15, wherein the processor is further configured to:
periodically change the first random number; and
store each transmitted random number.

20. The base station of claim 18, wherein the processor is further configured to:
verify that the geographical information related to the serving cell indicates that a degree of proximity between the serving cell and the neighbor cell is greater than a predetermined or derived threshold.

* * * * *

UNITED STATES PATENT AND TRADEMARK OFFICE
CERTIFICATE OF CORRECTION

PATENT NO. : 8,630,648 B2
APPLICATION NO. : 13/061758
DATED : January 14, 2014
INVENTOR(S) : Rune et al.

It is certified that error appears in the above-identified patent and that said Letters Patent is hereby corrected as shown below:

In the Specification

In Column 9, Line 5, delete "Geodetic 1984" and insert -- Geodetic system 1984 --, therefor.

In Column 16, Lines 5-6, delete " $c_5 = \dfrac{\tan(0.8 \cdot \pi/2)}{A_{dep\text{-}conv\text{-}time}} \approx \dfrac{3.1}{A_{dep\text{-}conv\text{-}time}},$ " and insert -- $c_5 = \dfrac{\tan(0.8 \cdot \pi/2)}{A_{dep\text{-}conv\text{-}time}} \approx \dfrac{3.1}{A_{dep\text{-}conv\text{-}time}},$ --.

Signed and Sealed this
Fifteenth Day of July, 2014

Michelle K. Lee
*Deputy Director of the United States Patent and Trademark Office*